United States Patent
Xu et al.

(10) Patent No.: US 12,375,938 B2
(45) Date of Patent: Jul. 29, 2025

(54) TRAFFIC VOLUME PREDICTION METHOD AND APPARATUS

(71) Applicant: HUAWEI TECHNOLOGIES CO., LTD., Shenzhen (CN)

(72) Inventors: Ruiyue Xu, Shanghai (CN); Kai Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/543,026

(22) Filed: Dec. 6, 2021

(65) Prior Publication Data

US 2022/0095164 A1 Mar. 24, 2022

Related U.S. Application Data

(63) Continuation of application No. PCT/CN2020/091586, filed on May 21, 2020.

(30) Foreign Application Priority Data

Jun. 6, 2019 (CN) .......................... 201910490641.2

(51) Int. Cl.
*H04W 28/08* (2023.01)
*H04L 41/0896* (2022.01)
(Continued)

(52) U.S. Cl.
CPC ..... *H04W 28/0942* (2020.05); *H04L 41/0896* (2013.01); *H04W 84/042* (2013.01); *H04W 84/06* (2013.01)

(58) Field of Classification Search
CPC ........... H04W 28/0942; H04W 84/042; H04W 84/06; H04L 41/0896
See application file for complete search history.

(56) References Cited

U.S. PATENT DOCUMENTS 6,272,450 B1 * 8/2001 Hill ....................... H04W 24/00
703/22
7,031,895 B1 * 4/2006 Takahashi ............... G06F 30/20
703/13
(Continued)

FOREIGN PATENT DOCUMENTS

CN 101778400 A 7/2010
CN 103987056 A 8/2014
(Continued)

OTHER PUBLICATIONS

3GPP TR 23.791 V1.0.0 (Sep. 2018), 3rd Generation Partnership Project; Technical Specification Group Services and System Aspects; Study of Enablers for Network Automation for 5G(Release 16), 66 pages.
(Continued)

*Primary Examiner* — Kenny S Lin
(74) *Attorney, Agent, or Firm* — Hauptman Ham, LLP

(57) ABSTRACT

A method includes receiving, by a first management device, a first message from a second management device, and determining a predicted traffic volume corresponding to a traffic type for a predicted object based on a prediction requirement information. The first message is useable to request the first management device to perform traffic volume prediction. The first message includes the predicted object, the traffic type, and the prediction requirement information. The prediction requirement information includes a prediction granularity or a prediction period. The prediction granularity includes at least one of a prediction area, a prediction service type, a prediction slice, a prediction cell, a prediction public land mobile communications network or a prediction tenant.

17 Claims, 4 Drawing Sheets

(51) Int. Cl.
   *H04W 84/04* (2009.01)
   *H04W 84/06* (2009.01)

(56) References Cited

U.S. PATENT DOCUMENTS

| | | | | |
|---|---|---|---|---|
| 8,391,248 | B2* | 3/2013 | Ferrato | H04W 16/18 370/335 |
| 11,197,202 | B2* | 12/2021 | Samdanis | H04W 16/14 |
| 2005/0097161 | A1* | 5/2005 | Chiou | H04W 16/18 709/200 |
| 2007/0230437 | A1 | 10/2007 | Schopf | |
| 2008/0016213 | A1* | 1/2008 | Akinaga | H04L 41/147 709/226 |
| 2009/0319248 | A1* | 12/2009 | White | G06F 21/577 703/13 |
| 2012/0020216 | A1* | 1/2012 | Vashist | H04L 47/10 370/235 |
| 2014/0046645 | A1* | 2/2014 | White | H04L 63/1433 703/13 |
| 2015/0289149 | A1* | 10/2015 | Ouyang | H04W 16/18 370/252 |
| 2016/0157114 | A1* | 6/2016 | Kalderen | H04W 24/08 370/252 |
| 2017/0339022 | A1* | 11/2017 | Hegde | G06N 3/044 |
| 2018/0262921 | A1* | 9/2018 | Buldorini | H04W 16/18 |
| 2018/0270624 | A1 | 9/2018 | Lee et al. | |
| 2018/0376407 | A1 | 12/2018 | Myhre et al. | |
| 2019/0036789 | A1 | 1/2019 | Kaplunov et al. | |
| 2019/0140933 | A1* | 5/2019 | Guim Bernat | H04L 47/2425 |
| 2019/0166606 | A1* | 5/2019 | Kalderen | H04W 24/02 |
| 2022/0191783 | A1* | 6/2022 | Huang | H04W 52/0206 |

FOREIGN PATENT DOCUMENTS

| | | | |
|---|---|---|---|
| CN | 104901827 A | 9/2015 | |
| CN | 105873087 A | 8/2016 | |
| CN | 106469332 A | 3/2017 | |
| CN | 107301466 A | 10/2017 | |
| WO | WO-03069935 A1 * | 8/2003 | H04L 12/2697 |

OTHER PUBLICATIONS

3GPP TR 23.791 V0.4.0 (Jun. 2018), 3rd Generation Partnership Project; Technical Specification Group Services and System Aspects; Study of Enablers for Network Automation for 5G(Release 16), 32 pages.

International Search Report issued in corresponding International Application No. PCT/CN2020/091586, dated Jul. 30, 2020, pp. 1-8.

Chinese Office Action issued in corresponding Chinese Application No. 2019104906412, dated Aug. 7, 2021, pp. 1-10.

Extended European Search Report issued in corresponding European Application No. 20817849.1, dated Jun. 10, 2022, pp. 1-5.

* cited by examiner

TRAFFIC VOLUME PREDICTION METHOD AND APPARATUS

CROSS-REFERENCE TO RELATED APPLICATIONS

This application is a continuation of International Application No. PCT/CN2020/091586, filed on May 21, 2020, which claims priority to Chinese Patent Application No. 201910490641.2, filed on Jun. 6, 2019, the disclosures of the aforementioned applications are hereby incorporated by reference in their entireties.

TECHNICAL FIELD

This application relates to the communication field, and in particular, to a traffic volume prediction method and an apparatus in the communication field.

BACKGROUND

As terminal devices increase and with diversity of services, networks become increasingly complex, and consequently network operation and maintenance becomes more and more difficult. Network optimization and on-demand network resource scheduling are key factors for fast service assurance and improved user experience.

Existing network optimization mechanisms consider measures to optimize networks after network performance deterioration (for example, traffic congestion) is detected. However, network optimization is a time-consuming process, to be specific, steps such as algorithm optimization, effect evaluation, decision-making, and reconfiguration are performed. As a result, service requirements may be affected in a specified period of time, and problems such as no user access, time-consuming user access, and frame freezing may occur in a specified period of time.

5G services (for example, an enhanced mobile broadband (eMBB) service, a massive machine-type communications (mMTC) service, and a low-latency and ultra-reliable communication (URLLC) service) have higher dynamic requirements. How to flexibly schedule limited radio resources to ensure multiple services and massive users is a great challenge. Existing radio resources are statically allocated, resulting in excessive or insufficient radio resources at some time points and in some areas. Consequently, resource allocation is improper, and service requirements are affected.

SUMMARY

One or more embodiments of this application include a method and an apparatus, so that traffic volume prediction can be performed, that helps avoid impact on a service due to improper resource allocation.

According to at least a first aspect, a traffic volume prediction method is provided. The method includes: A first management device receives a first message from a second management device, where the first message is used to request the first management device to perform traffic volume prediction, the first message includes a predicted object, a traffic type, and prediction requirement information, and the prediction requirement information includes a prediction granularity and/or a prediction period, where the prediction granularity includes at least one of the following: a prediction area, a prediction service type, a prediction slice, a prediction cell, a prediction public land mobile communications network (PLMN), or a prediction tenant; and the first management device determines, for the predicted object based on the prediction requirement information, a predicted traffic volume corresponding to the traffic type.

According to the traffic volume prediction method in some embodiments of this application, the first management device can predict, based on the predicted object, the traffic type, and the prediction requirement information that are sent by the second management device, a traffic volume, of the predicted object, that meets the prediction requirement information. In this way, resources in a network can be allocated on demand based on the obtained predicted traffic volume. This helps avoid impact on a service due to improper resource allocation, and improves system performance.

For example, the first management device may continuously collect, within a period of time, and analyze at least one historical traffic volume, of the predicted object, that corresponds to the traffic type included in the first message; analyze the historical traffic volume within the period of time, to obtain a rule of the historical traffic volume; and then obtain, according to the rule of the historical traffic volume and based on the at least one historical traffic volume, a predicted traffic volume that meets the prediction requirement information, namely, the predicted traffic volume, corresponding to the traffic type, that is determined based on the prediction requirement information in some embodiments of this application.

In some embodiments of this application, the traffic volume obtained by using the prediction method may be referred to as a predicted traffic volume, and an actual predicted traffic volume may be referred to as a traffic volume or a historical traffic volume. However, it should be understood that this is merely for ease of distinguishing an actual value of the traffic volume from a prediction value of the traffic volume. A name thereof is not limited in some embodiments of this application. The traffic volume may also be referred to as a service volume, or may have another name. This is not limited in some embodiments of this application.

With reference to at least the first aspect, in some embodiments, the traffic type includes at least one of the following: a quantity of users, user distribution, a user activation ratio, coverage, a throughput, a quantity of radio resource control (RRC) connections, a quantity of physical resource blocks (PRBs), PRB usage, or load information.

The quantity of users may be a quantity of registered users or a quantity of activated users.

With reference to at least the first aspect, in some embodiments, the predicted object includes at least one of the following: a service, a network, a network element, a network function, or a cell.

For example, the first message may carry information used to indicate the predicted object, for example, a service identifier, a network identifier, a network element identifier, a network function identifier, or a cell identifier. For example, the network identifier is used to identify an object of the current prediction service, and the network may be a subnetwork (subnetwork), a network slice (network slice), a network slice subnet (network slice subnet), or the like. Correspondingly, the network identifier may be a subnetwork identifier, a network slice instance identifier, a network slice subnet instance identifier, a network slice selection assistance identifier (s-NSSAI), or the like.

With reference to at least the first aspect, in some embodiments, before the first management device determines, for the predicted object based on the prediction requirement information, a predicted traffic volume corresponding to the traffic type, the method further includes: The first management device configures traffic volume prediction service information under a managed object of the predicted object based on the first message, where the traffic volume prediction service information is used to indicate to predict a traffic volume of the traffic type based on the prediction requirement information, and the traffic volume prediction service information includes the traffic type and the prediction requirement information.

For example, when the first message includes the predicted object, after the first management device receives the first message, the first management device may create a traffic prediction service for the managed object of the predicted object, that is, configure the traffic prediction service information, to predict the current traffic volume. Specifically, the first management device may include information such as the traffic type, the prediction granularity, and the prediction period in the current traffic prediction service information.

With reference to at least the first aspect, in some embodiments, that the first management device determines, for the predicted object based on the prediction requirement information, a predicted traffic volume corresponding to the traffic type includes: When the prediction requirement information includes the prediction granularity, the first management device collects the traffic volume based on the prediction granularity, and determines, based on the collected traffic volume, the predicted traffic volume corresponding to the traffic type at the prediction granularity. Alternatively, when the prediction requirement information includes the prediction period, the first management device collects the traffic volume, and determines, based on the collected traffic volume, the predicted traffic volume corresponding to the traffic type in the prediction period. Alternatively, when the prediction requirement information includes the prediction granularity and the prediction period, the first management device collects the traffic volume based on the prediction granularity, and determines, based on the collected traffic volume, the predicted traffic volume corresponding to the traffic type at the prediction granularity and in the prediction period.

With reference to at least the first aspect, in some embodiments, before the first management device determines, based on the prediction requirement information, the traffic volume corresponding to the traffic type, the method further includes: The first management device determines, based on the first message, a predicted sub-object associated with the predicted object; and the first management device sends a seventh message to a management device of the predicted sub-object, where the seventh message is used to request the management device of the predicted sub-object to predict a traffic volume of the predicted sub-object.

For example, the first management device may determine the predicted sub-object based on the predicted object. For example, current network traffic volume prediction may be classified into access network traffic volume prediction and core network traffic volume prediction, network traffic volume prediction of different areas, or network traffic volume prediction of different sites. The first management device may separately send, to the management device of the predicted sub-object, the seventh message for requesting to perform traffic volume prediction of the predicted sub-object. After receiving the seventh message, the management device of the predicted sub-object may configure traffic prediction service information for the predicted sub-object for the managed object of the predicted sub-object.

It should be understood that one managed object corresponds to only one management device, but one management device may correspond to a plurality of managed objects.

With reference to at least the first aspect, in some embodiments, after the first management device determines, for the predicted object based on the prediction requirement information, a predicted traffic volume corresponding to the traffic type, the method further includes: The first management device sends a second message to the second management device, where the second message is used to indicate a traffic volume prediction result, and the second message carries at least one predicted traffic volume corresponding to the traffic type.

It should be understood that the first management device may send the traffic volume prediction result including the at least one predicted traffic volume to the second management device. The at least one predicted traffic volume may be determined by the first management device based on the predicted object, the traffic type, and the prediction requirement information. For example, if the second message carries a plurality of predicted traffic volumes, the plurality of predicted traffic volumes may each correspond to one piece of time information. For example, a quantity of the plurality of predicted traffic volumes is 24, respectively corresponding to 24 hours in a day. The predicted traffic volume may be a maximum value, a minimum value, an average value, or the like of predicted traffic volumes in each hour. This is not limited in some embodiments of this application. In some embodiments, the time information and the plurality of predicted traffic volumes may be carried in the second message, and the time information and the predicted traffic volumes are bound in a one-to-one manner. In another possible implementation, the first management device and the second management device may pre-agree on a sending sequence of a plurality of predicted traffic volumes, so that the sending sequence of the plurality of predicted traffic volumes corresponds to an agreed time sequence, and the second management device may obtain, according to an agreement, a predicted traffic volume corresponding to specific time.

With reference to at least the first aspect, in some embodiments, after the first management device determines, for the predicted object based on the prediction requirement information, a predicted traffic volume corresponding to the traffic type, the method further includes: The first management device receives a third message from the second management device, where the third message is used to request the first management device to return the predicted traffic volume, and the third message carries information about a to-be-queried object and information about a query granularity; and the first management device sends a fourth message to the second management device based on the third message, where the fourth message is used to indicate a predicted traffic volume of the to-be-queried object at the query granularity.

It should be understood that the to-be-queried object includes all or a part of the predicted objects, and the query granularity includes all or a part of the prediction granularities. In this way, the first management device can obtain the corresponding predicted traffic volume based on the to-be-queried object and the query granularity. In some embodiments, the third message further includes query time, and is used to predict a traffic volume at a specific time point or a specific time period.

With reference to at least the first aspect, in some embodiments, after the first management device determines, for the predicted object based on the prediction requirement information, a predicted traffic volume corresponding to the traffic type, the method further includes: The first management device receives a fifth message from the second management device, where the fifth message is to request to perform traffic volume evaluation, and the fifth message carries information about an evaluated object, information about evaluation time, and a traffic volume requirement value; the first management device determines, based on the fifth message, whether the evaluated object can meet the traffic volume requirement value within the evaluation time; and the first management device sends a sixth message to the second management device, where the sixth message is used to indicate a traffic volume evaluation result.

It should be understood that the evaluated object includes all or a part of the predicted objects. A specific evaluation situation is similar to that of the to-be-queried object. Details are not described herein again. In some embodiments of this application, the fifth message sent by the second management device to the first management device may carry the traffic volume requirement value, and the first management device may directly determine, based on the traffic volume requirement value and with reference to the evaluated object and the evaluation time, whether a traffic volume of the evaluated object can meet the traffic volume requirement value within the evaluation time. Therefore, the traffic volume evaluation result in some embodiments of this application is "yes" or "no".

In some embodiments, if the traffic volume evaluation result is "no", the second management device may adjust the traffic volume requirement value, and perform reevaluation. However, this is not limited in some embodiments of this application.

With reference to at least the first aspect, in some embodiments, the first message is a traffic volume measurement control request, the traffic volume measurement control request further carries prediction indication information, and the prediction indication information is used to indicate the first management device to perform traffic volume prediction.

It should be understood that the first message may be a message used only to request traffic volume prediction, or may reuse another message. This is not limited in some embodiments of this application. In a possible implementation, the first message is included in a traffic volume measurement control request message, in other words, the traffic volume measurement control request message not only requests the first management device to perform traffic volume measurement control, but also requests, by using the first message carried in the traffic volume measurement control request message, the first management device to perform traffic volume prediction.

According to at least a second aspect, another traffic volume prediction method is provided. The method includes: A second management device sends a first message to a first management device, where the first message is used to request the first management device to perform traffic volume prediction, the first message includes a predicted object, a traffic type, and prediction requirement information, and the prediction requirement information includes a prediction granularity and/or a prediction period, where the prediction granularity includes at least one of the following: a prediction area, a prediction service type, a prediction slice, a prediction cell, a prediction public land mobile communications network PLMN, or a prediction tenant; and the second management device receives a predicted traffic volume from the first management device.

With reference to at least the second aspect, in some embodiments, the traffic type includes at least one of the following: a quantity of users, user distribution, a user activation ratio, coverage, a throughput, a quantity of radio resource control RRC connections, a quantity of physical resource blocks PRBs, PRB usage, or load information.

With reference to at least the second aspect, in some embodiments, the predicted object includes at least one of the following: a service, a network, a network element, a network function, or a cell.

With reference to at least the second aspect, in some embodiments, that the second management device receives a predicted traffic volume from the first management device includes: The second management device receives a second message from the first management device, where the second message is used to indicate a traffic volume prediction result, and the second message carries at least one predicted traffic volume corresponding to the traffic type.

With reference to at least the second aspect, in some embodiments, after the second management device sends the first message to the first management device, the method further includes: The second management device sends a third message to the first management device, where the third message is used to request the first management device to return the predicted traffic volume, and the third message carries information about a to-be-queried object and information about a query granularity; and that the second management device receives a predicted traffic volume from the first management device includes: The second management device receives a fourth message from the first management device, where the fourth message is used to indicate a predicted traffic volume of the to-be-queried object at the query granularity.

With reference to at least the second aspect, in some embodiments, after the second management device sends the first message to the first management device, the method further includes: The second management device sends a fifth message to the first management device, where the fifth message is to request to perform traffic volume evaluation, and the fifth message carries information about an evaluated object, information about evaluation time, and a traffic volume requirement value; and that the second management device receives a predicted traffic volume from the first management device includes: The second management device receives a sixth message from the first management device, where the sixth message is used to indicate a traffic volume evaluation result.

According to at least a third aspect, an apparatus is provided. The apparatus is configured to perform the method according to any one of the foregoing aspects or the possible implementations of the foregoing aspects. Specifically, the apparatus includes units configured to perform the method according to any one of the foregoing aspects or the possible implementations of the foregoing aspects. In some embodiments, the apparatus may include modules that are in a one-to-one correspondence with the methods/operations/steps/actions described in the foregoing aspects. The modules may be implemented by a hardware circuit, software, or a combination of a hardware circuit and software.

In some embodiments, the apparatus is a communication chip. The communication chip may include an input circuit or interface configured to send information or data, and an output circuit or interface configured to receive information or data.

In some embodiments, the apparatus is a communication device. The communication device may include a transmitter configured to send information or data, and a receiver configured to receive information or data.

In some embodiments, the apparatus is configured to perform the method according to any one of the foregoing aspects or the possible implementations of the foregoing aspects. The apparatus may be configured in a network device, or the apparatus is a network device.

According to at least a fourth aspect, an apparatus is provided. The apparatus includes a processor. The processor is coupled to a memory. The memory is configured to store a computer program. The processor is configured to invoke the computer program from the memory and run the computer program, so that the apparatus performs the communication method according to any one of the foregoing aspects or the possible implementations of the foregoing aspects.

In some embodiments, there are one or more processors and one or more memories.

In some embodiments, the memory may be integrated with the processor, or the memory and the processor are separately disposed.

In some embodiments, the communication device further includes a transmitter (a transmitter machine) and a receiver (a receiver machine). The transmitter and the receiver may be separately disposed, or may be integrated together as a transceiver.

According to at least a fifth aspect, a communication system is provided. The communication system includes a first management device and a second management device, where the second management device is configured to send a first message to the first management device, where the first message is used to request the first management device to perform traffic volume prediction, the first message includes a predicted object, a traffic type, and prediction requirement information, and the prediction requirement information includes a prediction granularity and/or a prediction period, where the prediction granularity includes at least one of the following: a prediction area, a prediction service type, a prediction slice, a prediction cell, a prediction public land mobile communications network PLMN, or a prediction tenant; the first management device is configured to: receive the first message, determine, for the predicted object based on the prediction requirement information, a predicted traffic volume corresponding to the traffic type, and send the predicted traffic volume to the second management device; and the second management device is further configured to receive the predicted traffic volume.

With reference to at least the fifth aspect, in some embodiments, before determining, for the predicted object based on the prediction requirement information, the predicted traffic volume corresponding to the traffic type, the first management device is configured to configure traffic volume prediction service information for a managed object of the predicted object based on the first message, where the traffic volume prediction service information is used to indicate to predict a traffic volume of the traffic type based on the prediction requirement information, and the traffic volume prediction service information includes the traffic type and the prediction requirement information.

With reference to at least the fifth aspect, in some embodiments, the first management device is configured to: when the prediction requirement information includes the prediction granularity, collect the traffic volume based on the prediction granularity, and determine, based on the collected traffic volume, the predicted traffic volume corresponding to the traffic type at the prediction granularity; or when the prediction requirement information includes the prediction period, collect the traffic volume, and determine, based on the collected traffic volume, the predicted traffic volume corresponding to the traffic type in the prediction period; or when the prediction requirement information includes the prediction granularity and the prediction period, collect the traffic volume based on the prediction granularity, and determine, based on the collected traffic volume, the predicted traffic volume corresponding to the traffic type at the prediction granularity and in the prediction period.

With reference to at least the fifth aspect, in some embodiments, the first management device is further configured to: send a second message to the second management device, where the second message is used to indicate a traffic volume prediction result, and the second message carries at least one predicted traffic volume corresponding to the traffic type; and the second management device is further configured to receive the second message.

With reference to at least the fifth aspect, in some embodiments, the second management device is further configured to: send a third message to the first management device, where the third message is used to request the first management device to return the predicted traffic volume, and the third message carries information about a to-be-queried object and information about a query granularity; the first management device is further configured to: receive the third message, and send a fourth message to the second management device based on the third message, where the fourth message is used to indicate a predicted traffic volume of the to-be-queried object at the query granularity; and the second management device is further configured to receive the fourth message.

With reference to at least the fifth aspect, in some embodiments, the second management device is further configured to: send a fifth message to the first management device, where the fifth message is to request to perform traffic volume evaluation, and the fifth message carries information about an evaluated object, information about evaluation time, and a traffic volume requirement value; the first management device is further configured to: receive the fifth message, determine, based on the fifth message, whether the evaluated object can meet the traffic volume requirement value within the evaluation time, and send a sixth message to the second management device, where the sixth message is used to indicate a traffic volume evaluation result; and the second management device is further configured to receive the sixth message.

With reference to at least the fifth aspect, in some embodiments, the traffic type includes at least one of the following: a quantity of users, user distribution, a user activation ratio, coverage, a throughput, a quantity of radio resource control RRC connections, a quantity of physical resource blocks PRBs, PRB usage, or load information.

With reference to at least the fifth aspect, in some embodiments, the predicted object includes at least one of the following: a service, a network, a network element, a network function, or a cell.

According to at least a sixth aspect, a computer program product is provided. The computer program product includes computer program code. When the computer program code is run by a computer, the computer is enabled to perform the method according to any one of the foregoing aspects or the possible implementations of the foregoing aspects.

According to at least a seventh aspect, a computer-readable medium is provided. The computer-readable medium is configured to store instructions; and when the instructions are run on a computer, the computer is enabled to perform the instructions of the method according to any one of the foregoing aspects or the possible implementations of the foregoing aspects.

According to at least an eighth aspect, one or more embodiments of this application provide a chip system. The chip system includes one or more processors, configured to invoke instructions from a memory and run the instructions stored in the memory, so that the method according to any one of the foregoing aspects or the possible implementations of the foregoing aspects is performed. The chip system may include a chip, or may include the chip and another discrete component.

The chip system may include an input circuit or interface configured to send information or data, and an output circuit or interface configured to receive information or data.

DETAILED DESCRIPTION OF EMBODIMENTS

The following describes one or more technical solutions in the present application with reference to the accompanying drawings.

The technical solutions of embodiments of this application may be used for various communication systems, for example, a long term evolution (LTE) system, an LTE frequency division duplex (FDD) system, an LTE time division duplex (TDD) system, a universal mobile telecommunications system (UMTS), a 5th generation (5G) system, a new radio (NR) system, and another evolved communication system.

Figure 1:
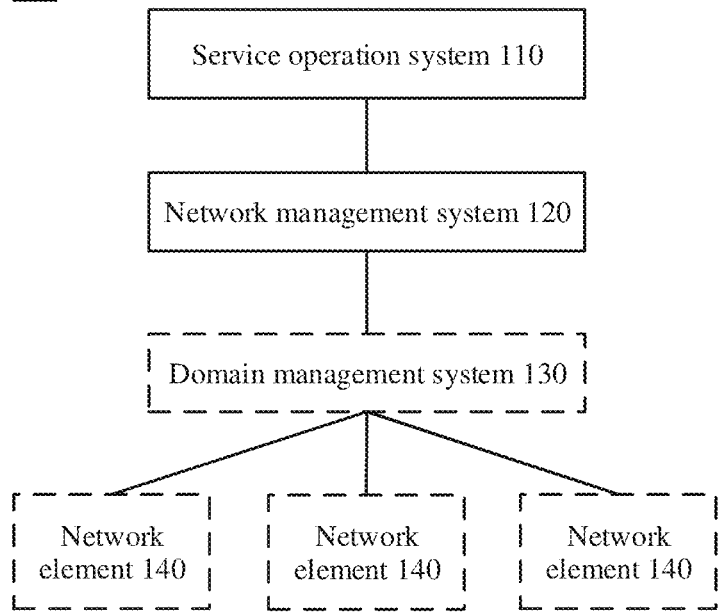
FIG. 1 is a schematic diagram of a structure of a system architecture according to at least an embodiment of this application.

FIG. 1 shows a system architecture 100 to which the embodiments of this application may be applied. The system architecture 100 may include a service operation system 110 and a network management system 120.

The service operation system 110 is configured to provide service operation functions, including functions such as service provisioning, service assurance, and service scheduling. For example, the service operation system 110 may include a service operation system of a vertical industry or a service operation system of a carrier, for example, a business support system (BSS) or a system that can implement a communication service management function (CSMF).

The network management system 120 is configured to provide network operation and maintenance functions, including: network life cycle management, network deployment, network fault management, network performance management, network configuration management, network assurance, and the like. The foregoing network may include one or more network elements, or one or more subnetworks. For example, the network management system 120 may be a system that can implement a network slice management function (NSMF), or a system that can implement a management data analytics function (MDAF).

In some embodiments, the system architecture 100 may further include a domain management system 130 and one or more network elements 140. The domain management system 130 is configured to provide an intra-domain network operation and maintenance function, namely, an operation and maintenance function of a subnetwork or a network element. The domain management system 130 may provide life cycle management of the subnetwork or the network element, deployment of the subnetwork or the network element, fault management of the subnetwork or the network element, performance management of the subnetwork or the network element, assurance of the subnetwork or the network element, and the like. The foregoing subnetwork may include one or more network elements. For example, the domain management system 130 may be a system that can implement a network slice subnet management function (network slice subnet management function), a domain manager (DM), an element manager (EM), or the like.

The network element 140 is an entity that provides a network service, and may include a core network element and an access network element. The core network element may be a device, for example, an access and mobility management function (AMF) network element, a session management function (SMF) network element, a policy control function (PCF) network element, a network data analytics unit (NWDAF) network element, a network repository function (NRF) network element, and a gateway. The access network element may be a device configured to communicate with a terminal device. The access network element may also be referred to as an access network device or a radio access network device, and may be a transmission reception point (TRP), an evolved NodeB (eNB or eNodeB) in an LTE system, a home NodeB (for example, a home evolved NodeB or a home NodeB, HNB), a baseband unit (BBU), or a radio controller in a cloud radio access network (CRAN) scenario. Alternatively, the access network element may be a relay station, an access point, a vehicle-mounted device, a wearable device, a network device in a 5G network or a network device in a future evolved PLMN network, an access point (AP) in a WLAN, or a gNB in a new radio (NR) system. This is not limited in the embodiments of this application. In a network structure, the access network element may include a centralized unit (CU) node, a distributed unit (DU) node, a RAN device including a CU node and a DU node, or a RAN device including a CU control plane node (CU-CP node), a CU user plane node (CU-UP node), and a DU node.

Related functions of the service operation system 110 and the network management system 120 in FIG. 1 may be implemented through a management device. For example, all functions of the service operation system 110 and the network management system 120 may be integrated into the management device by using software. In this specification, a network entity corresponding to the network management system 120 is a first management device, and a network entity corresponding to the service operation system 110 is a second management device. For ease of description, network entities configured to implement the foregoing systems are referred to as management devices in this specification, and the first management device and the second management device are used to describe the embodiments of this application. However, it should be understood that the network entities may alternatively have other names. This is not limited in the embodiments of this application.

Network entities corresponding to the domain management system 130, the service operation system 110, and the network management system 120 are management devices. FIG. 1 shows an example of one domain management system 130 and three network elements 140 managed by the domain management system 130. In some embodiments, the system architecture 100 may include another domain management system and another quantity of network elements managed by the another domain management system. This is not limited in the embodiments of this application. In some embodiments, the system architecture 100 may further include other network entities such as a network controller and a mobility management entity. This is not limited in the embodiments of this application.

In the embodiments of this application, the management device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more types of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a network device, or a functional module that is in the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but are not limited to a radio channel and various other media that can store, include, and/or carry instructions and/or data.

As terminal devices increase and with diversity of services, networks become increasingly complex, and consequently network operation and maintenance becomes more and more difficult. Network optimization and on-demand network resource scheduling are key factors for fast service assurance and improved user experience.

Existing network optimization mechanisms consider measures to optimize networks after network performance deterioration (for example, traffic congestion) is detected. However, network optimization is a time-consuming process, to be specific, steps such as algorithm optimization, effect evaluation, decision-making, and reconfiguration is performed. As a result, service requirements may be affected in a specified period of time, and problems such as no user access, time-consuming user access, and frame freezing may occur in a specified period of time.

5G services (for example, an enhanced mobile broadband (eMBB) service, a massive machine-type communications (mMTC) service, and a low-latency and ultra-reliable communication (e.g., ultra-reliable low-latency communication, (URLLC)) service) have higher dynamic requirements. How to flexibly schedule limited radio resources to ensure multiple services and massive users becomes the greatest challenge. Existing radio resources are statically allocated, resulting in excessive or insufficient radio resources at some time points and in some areas. Consequently, resource allocation is improper, and service requirements are affected.

In view of this, the embodiments of this application provide a method, so that traffic volume prediction can be performed, to help avoid impact on a service due to improper resource allocation.

Figure 2:
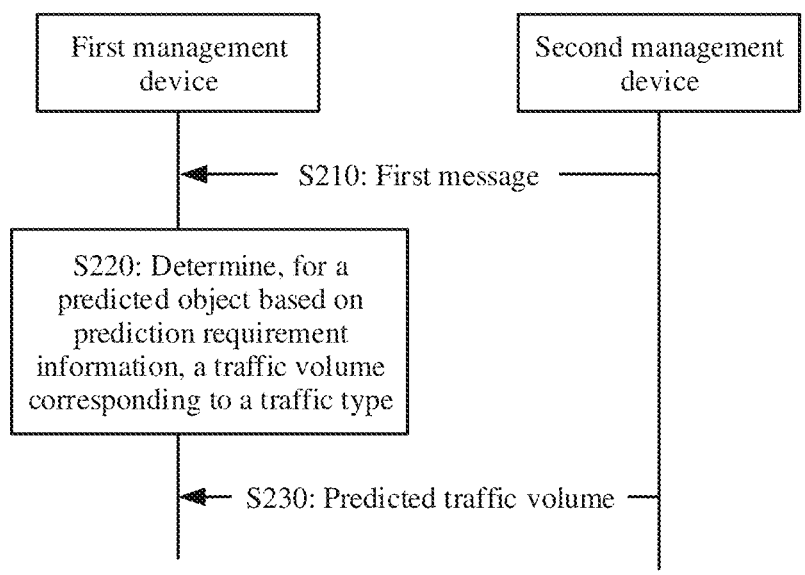
FIG. 2 is a schematic flowchart of a traffic volume prediction method according to at least an embodiment of this application.

FIG. 2 is a schematic flowchart of a traffic volume prediction method 200 according to an embodiment of this application. The method 200 may be applied to the system architecture 100 shown in FIG. 1. However, embodiments of this application are not limited thereto.

S210: A second management device sends a first message to a first management device, and correspondingly the first management device receives the first message from the second management device, where the first message is used to request the first management device to perform traffic volume prediction, the first message includes a predicted object, a traffic type, and prediction requirement information, and the prediction requirement information includes a prediction granularity and/or a prediction period, where the prediction granularity includes at least one of the following: a prediction area, a prediction service type, a prediction slice, a prediction cell, a prediction public land mobile communications network (PLMN), or a prediction tenant.

S220: The first management device determines, for the predicted object based on the prediction requirement information, a predicted traffic volume corresponding to the traffic type.

S230: The first management device sends the predicted traffic volume to the second management device, and correspondingly the second management device receives the predicted traffic volume from the first management device.

According to the traffic volume prediction method in some embodiments of this application, the first management device can predict, based on the predicted object, the traffic type, and the prediction requirement information that are sent by the second management device, a traffic volume, of the predicted object, that meets the prediction requirement information. In this way, resources in a network can be allocated on demand based on the obtained predicted traffic volume. This helps avoid impact on a service due to improper resource allocation, and improves system performance.

For example, the second management device may send, to the first management device, the first message for requesting to perform traffic volume prediction, and the first message may include the predicted object, the traffic type, and the prediction requirement information, so that the first management device determines, for the predicted object based on the prediction requirement information, the predicted traffic volume corresponding to the traffic type. In other words, the first management device may predict the traffic volume, of the predicted object, that meets the prediction requirement information and corresponds to the traffic type, and return the predicted traffic volume to the second management device.

For example, the first management device may continuously collect, within a period of time, a historical traffic volume, of the predicted object, that corresponds to the traffic type; analyze the historical traffic volume within the period of time, to obtain a rule of the historical traffic volume; and then determine, according to the rule of the historical traffic volume, a predicted traffic volume that meets the prediction requirement information, namely, the predicted traffic volume, corresponding to the traffic type, that is determined based on the prediction requirement information in some embodiments of this application.

In some embodiments of this application, the traffic volume obtained by using the prediction method may be referred to as a predicted traffic volume, and an actual predicted traffic volume may be referred to as a traffic volume or a historical traffic volume. However, it should be understood that this is merely for ease of distinguishing an actual value of the traffic volume from a prediction value of the traffic volume. A name thereof is not limited in some embodiments of this application. The traffic volume may also be referred to as a service volume, or may have another name. This is not limited in some embodiments of this application.

It should be understood that the first message may be a message used only to request traffic volume prediction, or may reuse another message. This is not limited in some embodiments of this application. In a possible implementation, the first message is included in a traffic volume measurement control request message, in other words, the traffic volume measurement control request message not only requests the first management device to perform traffic volume measurement control, but also requests, by using the first message carried in the traffic volume measurement control request message, the first management device to perform traffic volume prediction.

The prediction granularity indicates a prediction range supported by a current prediction service, and may specifically include one or more of the following:

(1) Prediction area, indicating that the current prediction service can perform traffic volume prediction on the network at an area granularity. Specifically, the prediction area may be indicated by using area code (for example, administrative area code or tracking area code (tracking area code)), or longitude and latitude information of the area (for example, a group of longitude and latitude points used to describe area information).

(2) Prediction site, indicating that the current prediction service can perform traffic volume prediction at a site granularity. The site may indicate a site (for example, a base station) of an access network, a site (for example, an AMF or a UPF) of a core network, or the like. Specifically, the site may be indicated by using an identifier of the site, for example, an identifier of the base station or an identifier of a core network element.

The identifier of the base station may alternatively be an identifier of a managed object of the base station, and the identifier of the core network element may alternatively be an identifier of a managed object of the core network element.

(3) Prediction cell, indicating that the current prediction service can perform traffic volume prediction at a cell granularity. Specifically, the prediction cell may be indicated by using an identifier of the cell or an identifier of a managed object of the cell.

(4) Prediction slice, including a network slice (NS) instance and a network slice subnet (NSS) instance and indicating that the current prediction service can perform traffic volume prediction at a granularity of a network slice, a network slice instance, or a network slice subnet instance.

(5) Prediction tenant, indicating that the current prediction service can perform traffic volume prediction at a tenant granularity. Specifically, the prediction tenant may be indicated by using an identifier of the tenant.

(6) Prediction service type, indicating that the current prediction service can perform traffic volume prediction at a service type granularity. For example, the service type may be eMBB, URLLC, massive internet of things (mIoT), wireless to the x (WTTx), video (video), or voice (voice).

(7) Prediction public land mobile communications network (PLMN), indicating that the current prediction service can perform traffic volume prediction at a PLMN granularity.

The prediction period indicates maximum prediction time that the current prediction service supports. For example, when the prediction period is one week, the current prediction service supports prediction of the traffic volume within one week. For another example, when the prediction period is one day, the current prediction service supports prediction of the traffic volume within one day.

The traffic type indicates a type of the traffic volume that the current prediction service supports. In some embodiments, the traffic type includes at least one of the following: a quantity of users, user distribution, a user activation ratio, coverage, a throughput, a quantity of radio resource control (RRC) connections, a quantity of physical resource blocks (PRBs), PRB usage, or load information. The quantity of users may be a quantity of registered users or a quantity of activated users. This is not limited in some embodiments of this application.

In some embodiments, the predicted object includes at least one of the following: a service, a network, a network element, a network function, or a cell.

For example, prediction based on the predicted object may specifically include the following plurality of cases:

When the predicted object is the service, it indicates that a predicted traffic volume of a specified service is predicted.

When the predicted object is the network, it indicates that an overall predicted traffic volume of a specified network is predicted.

When the predicted object is the service and the network, it indicates that a predicted traffic volume of a specified service in a specified network is predicted.

When the predicted object is the network element, it indicates that a predicted traffic volume of a specified network element is predicted.

When the predicted object is the network function, it indicates that a predicted traffic volume of a specified network function is predicted.

When the predicted object is the cell, it indicates that a predicted traffic volume of a specified cell is predicted.

When the predicted object is the cell and the network, it indicates that a predicted traffic volume of a specified network in a specified cell is predicted. One cell can support a plurality of networks.

It should be understood that there are a plurality of other possibilities for specific content of the predicted object, and the possibilities are not enumerated herein one by one.

For example, the first message may carry information used to indicate the predicted object, for example, a service identifier, a network identifier, a network element identifier, a network function identifier, or a cell identifier. For example, the network identifier is used to identify an object of the current prediction service, and the network may be a subnetwork (subnetwork), a network slice (network slice), a network slice subnet (network slice subnet), or the like. Correspondingly, the network identifier may be a subnetwork identifier, a network slice instance identifier, a network slice subnet instance identifier, a network slice selection assistance identifier ((e.g., single network slice selection assistance identifier, s-NSSAI)), or the like.

It should be understood that the network identifier may alternatively be an identifier of a managed object of a corresponding network. For example, the network slice instance identifier may be an identifier of a managed object of a network slice, the network slice subnet instance identifier may be an identifier of a managed object of a network slice subnet, and the subnetwork identifier may be an identifier of a managed object of a subnetwork. This is not limited in some embodiments of this application.

In some embodiments of this application, the first management device may determine, in different manners based on content included in the prediction requirement information, the predicted traffic volume corresponding to the traffic type. In some embodiments, that the first management device determines, for the predicted object based on the prediction requirement information, the predicted traffic volume corresponding to the traffic type includes:

When the prediction requirement information includes the prediction granularity, the first management device collects the traffic volume based on the prediction granularity, and determines, based on the collected traffic volume, the predicted traffic volume corresponding to the traffic type at the prediction granularity.

Alternatively, when the prediction requirement information includes the prediction period, the first management device collects the traffic volume, and determines, based on the collected traffic volume, the predicted traffic volume corresponding to the traffic type in the prediction period.

Alternatively, when the prediction requirement information includes the prediction granularity and the prediction period, the first management device collects the traffic volume based on the prediction granularity, and determines, based on the collected traffic volume, the predicted traffic volume corresponding to the traffic type at the prediction granularity and in the prediction period.

The following separately describes the foregoing three cases in detail.

Case 1: The prediction requirement information includes the prediction granularity, and the first management device may collect the traffic volume based on the prediction granularity, and determine the predicted traffic volume corresponding to the traffic type at the prediction granularity.

With reference to specific embodiments, the following describes in detail the foregoing traffic prediction method by using an example in which the predicted object is a network 1 and the traffic type is the quantity of users. Traffic volume prediction in the following embodiments refers to prediction of the quantity of users, that is, both the traffic volume and the predicted traffic volume are the quantity of users. Details are not described one by one.

(1) The prediction granularity is the prediction area.

Assuming that the network 1 can cover a plurality of areas, where the areas are respectively an area 1, an area 2, and an area 3, and the prediction granularity is the prediction area, it indicates that the first message is to request to perform traffic volume prediction at the area granularity corresponding to the network 1. Specifically, performing traffic volume prediction at the area granularity corresponding to the network 1 may include separately performing traffic volume prediction on (network 1, area 1), (network 1, area 2), and (network 1, area 3).

For example, after receiving the first message, the first management device may obtain area information included in the network 1, namely, information about the area 1, the area 2, and the area 3; collect a traffic volume of the network 1, analyze a correspondence between the traffic volume of the network 1 and each area, and obtain a traffic volume of each area of the network 1; and analyze the traffic volume of each area corresponding to the network 1, obtain a rule of the traffic volume of each area, and then calculate a predicted traffic volume of each area corresponding to the network 1. For example, for traffic volumes of (network 1, area 1) in the morning, at noon, and in the evening every day, traffic volumes in the morning, at noon, and in the evening in a day are different, but the traffic volumes in the morning, at noon, and in the evening every day are similar. For example, a traffic volume on Monday morning is similar to that on Tuesday morning. In this case, traffic volumes in the morning, at noon, and in the evening every day thereafter can be calculated by using the foregoing method. For another example, on each Sunday morning, a traffic volume of the area 1 (where there is a church) is quite heavy. In this case, a predicted traffic volume of the area 1 on each Sunday morning thereafter can be calculated by using the foregoing method.

(2) The prediction granularity is the prediction site.

Assuming that the network 1 includes a plurality of sites, where the sites are respectively a site 1, a site 2, and a site 3, and the prediction granularity is the prediction site, it indicates that the first message is to request to perform traffic volume prediction at the site granularity included in the network 1. Specifically, performing traffic volume prediction at the site granularity included in the network 1 may include separately performing traffic volume prediction on (network 1, site 1), (network 1, site 2), and (network 1, site 3).

For example, after receiving the first message, the first management device may obtain site information included in the network 1, namely, information about the site 1, the site 2, and the site 3; collect a traffic volume of the network 1, analyze a correspondence between the traffic volume of the network 1 and each site, and obtain a traffic volume of each site of the network 1; and analyze the traffic volume of each site corresponding to the network 1, obtain a rule of the traffic volume of each site, and then calculate a predicted traffic volume of each site corresponding to the network 1.

(3) The prediction granularity is the prediction cell.

Assuming that the network 1 includes a plurality of cells, where the cells are respectively a cell 1, a cell 2, and a cell 3, and the prediction granularity is the prediction cell, it indicates that the first message is to request to perform traffic volume prediction at the cell granularity included in the network 1. Specifically, performing traffic volume prediction at the cell granularity included in the network 1 may include separately performing traffic volume prediction on (network 1, cell 1), (network 1, cell 2), and (network 1, cell 3).

For example, after receiving the first message, the first management device may obtain cell information included in the network 1, namely, information about the cell 1, the cell 2, and the cell 3; collect a traffic volume of the network 1, analyze a correspondence between the traffic volume of the network 1 and each cell, and obtain a traffic volume of each cell of the network 1; and analyze the traffic volume of each cell corresponding to the network 1, obtain a rule of the traffic volume of each cell, and then calculate a predicted traffic volume of each cell corresponding to the network 1.

(4) The prediction granularity is the prediction slice.

Assuming that the network 1 includes a plurality of network slice instances, where the network slice instances are respectively a network slice instance 1, a network slice instance 2, and a network slice instance 3, and the prediction granularity is the prediction slice, it indicates that the first message is to request to perform traffic volume prediction at the slice granularity included in the network 1. Specifically, performing traffic volume prediction at the slice granularity included in the network 1 may include separately performing traffic volume prediction on (network 1, network slice instance 1), (network 1, network slice instance 2), and (network 1, network slice instance 3).

For example, after receiving the first message, the first management device may obtain network slice instance information included in the network 1, namely, information about the network slice instance 1, the network slice instance 2, and the network slice instance 3; collect a traffic volume of the network 1, analyze a correspondence between the traffic volume of the network 1 and each network slice instance, and obtain a traffic volume of each network slice instance of the network 1; and analyze the traffic volume of each network slice instance corresponding to the network 1, obtain a rule of the traffic volume of each network slice instance, and then calculate a predicted traffic volume of each network slice instance corresponding to the network 1.

(5) The prediction granularity is the prediction tenant.

Assuming that the network 1 includes a plurality of tenants, where the tenants are respectively a tenant 1, a tenant 2, and a tenant 3, and the prediction granularity is the prediction tenant, it indicates that the first message is to request to perform traffic volume prediction at the tenant granularity included in the network 1. Specifically, performing traffic volume prediction at the tenant granularity included in the network 1 may include separately performing traffic volume prediction on (network 1, tenant 1), (network 1, tenant 2), and (network 1, tenant 3).

For example, after receiving the first message, the first management device may obtain tenant information included in the network 1, namely, information about the tenant 1, the tenant 2, and the tenant 3; collect a traffic volume of the network 1, analyze a correspondence between the traffic volume of the network 1 and each tenant, and obtain a traffic volume of each tenant of the network 1; and analyze the traffic volume of each tenant corresponding to the network 1, obtain a rule of the traffic volume of each tenant, and then calculate a predicted traffic volume of each tenant corresponding to the network 1.

(6) The prediction granularity is the prediction service type.

Assuming that the network 1 includes a plurality of service types, where the service types are respectively a service type 1, a service type 2, and a service type 3, and the prediction granularity is the prediction service type, it indicates that the first message is to request to perform traffic volume prediction at the service type granularity included in the network 1. Specifically, performing traffic volume prediction at the service type granularity included in the network 1 may include separately performing traffic volume prediction on (network 1, service type 1), (network 1, service type 2), and (network 1, service type 3).

For example, after receiving the first message, the first management device may obtain service type information included in the network 1, namely, information about the service type 1, the service type 2, and the service type 3; collect a traffic volume of the network 1, analyze a correspondence between the traffic volume of the network 1 and each service type, and obtain a traffic volume of each service type of the network 1; and analyze the traffic volume of each service type corresponding to the network 1, obtain a rule of the traffic volume of each service type, and then calculate a predicted traffic volume of each service type corresponding to the network 1.

(7) The prediction granularity is the prediction PLMN.

Assuming that the network 1 includes a plurality of PLMNs, where the PLMNs are respectively a PLMN 1, a PLMN 2, and a PLMN 3, and the prediction granularity is the prediction PLMN, it indicates that the first message is to request to perform traffic volume prediction at the PLMN granularity included in the network 1. Specifically, performing traffic volume prediction at the PLMN granularity included in the network 1 may include separately performing traffic volume prediction on (network 1, PLMN 1), (network 1, PLMN 2), and (network 1, PLMN 3).

For example, after receiving the first message, the first management device may obtain PLMN information included in the network 1, namely, information about the PLMN 1, the PLMN 2, and the PLMN 3; collect a traffic volume of the network 1, analyze a correspondence between the traffic volume of the network 1 and each PLMN, and obtain a traffic volume of each PLMN of the network 1; and analyze the traffic volume of each PLMN corresponding to the network 1, obtain a rule of the traffic volume of each PLMN, and then calculate a predicted traffic volume of each PLMN corresponding to the network 1.

Case 2: The prediction requirement information includes the prediction period, and the first management device may collect the traffic volume and determine the predicted traffic volume corresponding to the traffic type in the prediction period.

For example, the predicted object is a network 1 and the traffic type is the quantity of users. The first management device may collect a traffic volume of the network 1, analyze the traffic volume of the network 1, and determine the predicted traffic volume in the prediction period, and both the traffic volume and the predicted traffic volume herein refer to the quantity of users.

Case 3: The prediction requirement information includes the prediction granularity and the prediction period, and the first management device may collect the traffic volume based on the prediction granularity, and determine the predicted traffic volume corresponding to the traffic type at the prediction granularity and in the prediction period. A specific method is similar to that described above, and details are not described herein again.

In some embodiments, before the first management device determines, for the predicted object based on the prediction requirement information, the predicted traffic volume corresponding to the traffic type, the method further includes: The first management device configures traffic volume prediction service information for a managed object of the predicted object based on the first message, where the traffic volume prediction service information is used to indicate to predict a traffic volume of the traffic type based on the prediction requirement information, and the traffic volume prediction service information includes the traffic type and the prediction requirement information.

For example, when the first message includes the predicted object, after the first management device receives the first message, the first management device may create a traffic prediction service for the managed object of the predicted object, that is, configure the traffic prediction service information, to predict the current traffic volume. Specifically, the first management device may include information such as the traffic type, the prediction granularity, and the prediction period in the current traffic prediction service information.

In some embodiments, before the first management device determines, for the predicted object based on the prediction requirement information, the predicted traffic volume corresponding to the traffic type, the method further includes: The first management device determines, based on the first message, a predicted sub-object associated with the predicted object; and the first management device sends a seventh message to a management device of the predicted sub-object, where the seventh message is used to request the management device of the predicted sub-object to predict a traffic volume of the predicted sub-object.

For example, the first management device may determine the predicted sub-object based on the predicted object. For example, current network traffic volume prediction may be classified into access network traffic volume prediction and core network traffic volume prediction, network traffic volume prediction of different areas, or network traffic volume prediction of different sites. The first management device may separately send, to the management device of the predicted sub-object, the seventh message for requesting to perform traffic volume prediction of the predicted sub-object. After receiving the seventh message, the management device of the predicted sub-object may configure traffic prediction service information for the predicted sub-object for the managed object of the predicted sub-object.

It should be understood that one managed object corresponds to only one management device, but one management device may correspond to a plurality of managed objects. In a possible implementation, the management device of the predicted sub-object in some embodiments of this application may be the domain management device 130 in FIG. 1, and the managed object may be the network element 140 in FIG. 1.

In some embodiments of this application, the second management device may predict the traffic volume in a plurality of manners.

In some embodiments, after the first management device determines, for the predicted object based on the prediction requirement information, the predicted traffic volume corresponding to the traffic type, the method further includes: The first management device sends a second message to the second management device, where the second message is used to indicate a traffic volume prediction result, and the second message carries at least one predicted traffic volume corresponding to the traffic type.

Correspondingly, that the second management device receives the predicted traffic volume from the first management device includes: The second management device receives the second message from the first management device.

It should be understood that the first management device may send the traffic volume prediction result including the at least one predicted traffic volume to the second management device. The at least one predicted traffic volume may be determined by the first management device based on the predicted object, the traffic type, and the prediction requirement information. For example, if the second message carries a plurality of predicted traffic volumes, the plurality of predicted traffic volumes may each correspond to one piece of time information. For example, a quantity of the plurality of predicted traffic volumes is 24, respectively corresponding to 24 hours in a day. The predicted traffic volume may be a maximum value, a minimum value, an average value, or the like of predicted traffic volumes in each hour. This is not limited in some embodiments of this application. In a possible implementation, the time information and the plurality of predicted traffic volumes may be carried in the second message, and the time information and the predicted traffic volumes are bound in a one-to-one manner. In another possible implementation, the first management device and the second management device may pre-agree on a sending sequence of a plurality of predicted traffic volumes, so that the sending sequence of the plurality of predicted traffic volumes corresponds to an agreed time sequence, and the second management device may obtain, according to an agreement, a predicted traffic volume corresponding to specific time.

In some embodiments of this application, the first management device may send the second message to the second management device based on an agreed reporting period, for example, send the second message every two days or every a week. In some embodiments, the reporting period may be a prediction period carried in the first message, that is, the second management device may indicate, by using the first message, the first management device to report the predicted traffic volume based on the prediction period.

In some embodiments, after the second management device sends the first message to the first management device, the method further includes: The second management device sends a third message to the first management device, where the third message is used to request the first management device to return the predicted traffic volume, and the third message carries information about a to-be-queried object and information about a query granularity. Correspondingly the first management device receives the third message from the second management device. The first management device sends a fourth message to the second management device based on the third message, where the fourth message is used to indicate a predicted traffic volume of the to-be-queried object at the query granularity. Correspondingly, that the second management device receives the predicted traffic volume from the first management device includes: The second management device receives the fourth message from the first management device.

It should be understood that the to-be-queried object includes all or a part of the predicted objects, and the query granularity includes all or a part of the prediction granularities. In this way, the first management device can obtain the corresponding predicted traffic volume based on the to-be-queried object and the query granularity. In some embodiments, the third message further includes query time, and is used to predict a traffic volume at a specific time point or a specific time period.

For example, prediction based on the to-be-queried object may specifically include the following plurality of cases:

When the to-be-queried object is the network identifier, it indicates that an overall predicted traffic volume of a specified network is queried.

When the to-be-queried object is the area information or the longitude and latitude information of the area, it indicates that a predicted traffic volume in a specified area is to be queried.

When the to-be-queried object is the area information or the network identifier, it indicates that a predicted traffic volume of a corresponding network in a specified area is to be queried. It should be understood that one area can correspond to a plurality of networks.

When the to-be-queried object is the site information, it indicates that a predicted traffic volume of a specified site is queried.

When the to-be-queried object is the site information and the network identifier, it indicates that a predicted traffic volume of a corresponding network in a specified site is queried. It should be understood that one site can support a plurality of networks.

When the to-be-queried object is the cell information, it indicates that a predicted traffic volume of a specified cell is queried.

When the to-be-queried object is the cell information and the network identifier, it indicates that a predicted traffic volume of a corresponding network in a specified cell is queried. It should be understood that one cell can support a plurality of networks.

When the to-be-queried object is the slice information, it indicates that a predicted traffic volume of a specified slice is queried.

When the to-be-queried object is the slice information and the network identifier, it indicates that a predicted traffic volume of a specified slice supported by a specified network is queried. It should be understood that one network can support a plurality of slices.

When the to-be-queried object is the tenant information, it indicates that a predicted traffic volume of a specified tenant is queried.

When the to-be-queried object is the tenant information and the network identifier, it indicates that a traffic volume of a specified tenant supported by a specified network is queried. It should be understood that one network can support a plurality of tenants.

When the to-be-queried object is the service type, it indicates that a predicted traffic volume of a specified service type is queried.

When the to-be-queried object is the service type and the network identifier, it indicates that a predicted traffic volume of a specified service type in a specified network is queried.

It should be understood that there are a plurality of other possibilities for specific content of the to-be-queried object, and the possibilities are not enumerated herein one by one.

In some embodiments, after the second management device sends the first message to the first management device, the method further includes: The second management device sends a fifth message to the first management device, where the fifth message is to request to perform traffic volume evaluation, and the fifth message carries information about an evaluated object, information about evaluation time, and a traffic volume requirement value. Correspondingly, the first management device receives the fifth message from the second management device, and the first management device determines, based on the fifth message, whether the evaluated object can meet the traffic volume requirement value within the evaluation time. The first management device sends a sixth message to the second management device, where the sixth message is used to indicate a traffic volume evaluation result. Correspondingly, that the second management device receives the predicted traffic volume from the first management device includes: The second management device receives the sixth message from the first management device, where the sixth message is used to indicate the traffic volume evaluation result.

It should be understood that the evaluated object includes all or a part of the predicted objects. A specific evaluation situation is similar to that of the to-be-queried object. Details are not described herein again. In some embodiments of this application, the fifth message sent by the second management device to the first management device may carry the traffic volume requirement value, and the first management device may directly determine, based on the traffic volume requirement value and with reference to the evaluated object and the evaluation time, whether a traffic volume of the evaluated object can meet the traffic volume requirement value within the evaluation time. Therefore, the traffic volume evaluation result in some embodiments of this application is "yes" or "no".

In some embodiments, if the traffic volume evaluation result is "no", the second management device may adjust the traffic volume requirement value, and perform reevaluation. However, this is not limited in some embodiments of this application.

It should be understood that terms "first", "second", "third", "fourth", and various numbers in the foregoing embodiments are merely used for differentiation for ease of description, and are not used to limit the scope of the embodiments of this application, for example, differentiate different messages.

An example in which the first management device is a network management system and the second management device is a service running system is used below to describe in detail the embodiments of this application with reference to a domain management system.

Figure 3:
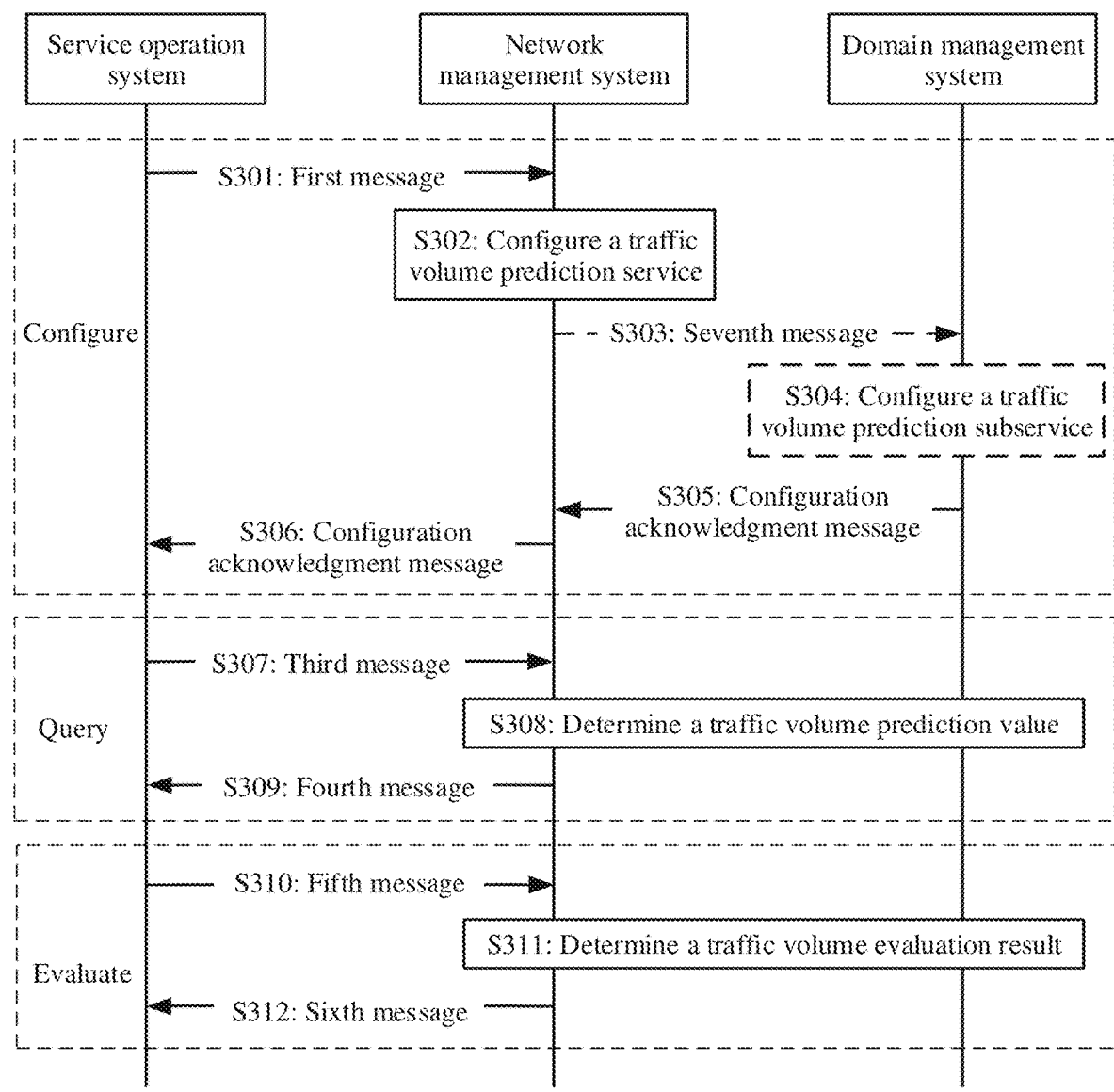
FIG. 3 is a schematic flowchart of another traffic volume prediction method according to at least an embodiment of this application.

FIG. 3 is a schematic flowchart of another traffic volume prediction method 300 according to an embodiment of this application. The method 300 may be applied to the system architecture 100 shown in FIG. 1. However, these embodiments of this application are not limited thereto.

S301: A service operation system sends a first message to a network management system, and correspondingly the network management system receives the first message. The first message includes a predicted object, a traffic type, and prediction requirement information, and the prediction requirement information includes a prediction granularity and/or a prediction period, where the prediction granularity includes at least one of the following: a prediction area, a prediction service type, a prediction slice, a prediction cell, a prediction public land mobile communications network PLMN, or a prediction tenant.

S302: The network management system configures traffic volume prediction service information based on the first message, where the traffic volume prediction service information includes the traffic type and the prediction requirement information.

S303: The network management system sends a seventh message to the domain management system, and correspondingly a domain management system receives the seventh message, where the seventh message is used to request a management device of a predicted sub-object to predict a traffic volume of the predicted sub-object.

S304: The domain management system configures traffic volume prediction subservice information based on the seventh message.

S305: The domain management system sends a configuration acknowledgment message to the network management system, to indicate that a corresponding traffic volume prediction subservice is successfully configured, and correspondingly the network management system receives the configuration acknowledgment message.

S306: The network management system sends a configuration acknowledgment message to the service operation system, to indicate that a traffic volume prediction service is successfully configured, and correspondingly the service operation system receives the configuration acknowledgment message.

In some embodiments, S307 to S309 show a process in which the service operation system queries a service volume.

S307: The service operation system sends a third message to the network management system, and correspondingly the network management system receives the third message, where the third message is used to request the network management system to return a predicted traffic volume, and the third message carries information about a to-be-queried object and information about a query granularity.

S308: The network management system performs query, that is, performs query based on the related traffic volume prediction service information and traffic volume prediction subservice information, to determine the predicted traffic volume.

S309: The network management system sends a fourth message to the service operation system, and correspondingly the service operation system receives the fourth message, where the fourth message is used to indicate the predicted traffic volume of the to-be-queried object at the query granularity.

In some embodiments, S310 to S312 show a process in which the service operation system evaluates the service volume.

S310: The service operation system sends a fifth message to the network management system, and correspondingly the network management system receives the fifth message, where the fifth message is to request to perform traffic volume evaluation, and the fifth message carries information about an evaluated object, information about evaluation time, and a traffic volume requirement value.

S311: The network management system performs evaluation, that is, invokes the related traffic volume prediction service and traffic volume prediction subservice, to determine a traffic volume evaluation result, where the traffic volume evaluation result indicates whether the evaluated object can meet the traffic volume requirement value within the evaluation time.

S312: The network management system sends a sixth message to the service operation system, where the sixth message carries the traffic volume evaluation result. Correspondingly, the service operation system receives the sixth message.

According to the traffic volume prediction method in some embodiments of this application, the first management device can predict, based on the predicted object, the traffic type, and the prediction requirement information that are sent by the second management device, a traffic volume, of the predicted object, that meets the prediction requirement information. In this way, resources in a network can be allocated on demand based on the obtained predicted traffic volume. This helps avoid impact on a service due to improper resource allocation, and improves system performance.

Figure 4:
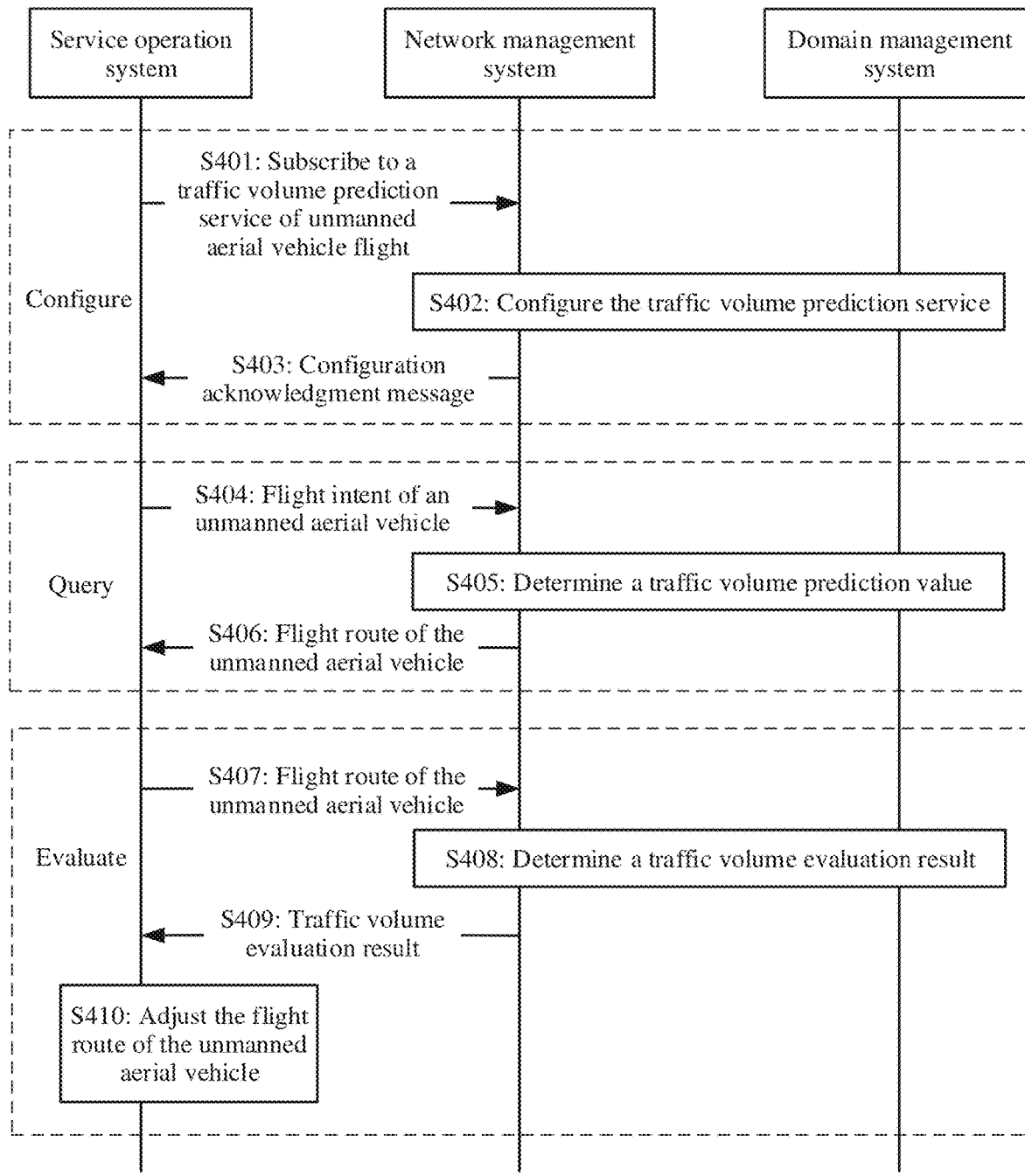
FIG. 4 is a schematic flowchart of another traffic volume prediction method according to at least an embodiment of this application.

FIG. 4 is a schematic flowchart of another traffic volume prediction method 400 according to an embodiment of this application. The method 400 may be applied to the system architecture 100 shown in FIG. 1. However, these embodiments of this application are not limited thereto.

S401: A service operation system sends, to a network management system, a request for subscribing to a traffic volume prediction service of unmanned aerial vehicle flight, where the request is equivalent to the first message in the foregoing embodiments, and the request carries requirement information of an unmanned aerial vehicle service, for example, a maximum quantity of users, a delay, and area information. Correspondingly, the network management system receives the request.

S402: The network management system interacts with a domain management system corresponding to the unmanned aerial vehicle service, to configure related information of the traffic volume prediction service.

S403: The network management system sends a configuration acknowledgment message to the service operation system, to indicate that the traffic volume prediction service is successfully configured, and correspondingly the service operation system receives the configuration acknowledgment message.

In some embodiments, S404 to S406 show a process in which the service operation system queries a service volume of an unmanned aerial vehicle.

S404: The service operation system sends a flight intent of the unmanned aerial vehicle to the network management system, where the flight intent of the unmanned aerial vehicle may specifically include information such as flight time, a departure place, and a destination. Correspondingly, the network management system receives the flight intent of the unmanned aerial vehicle.

S405: The network management system performs query based on the flight intent of the unmanned aerial vehicle, to determine a traffic volume prediction value.

S406: The network management system determines a flight route of the unmanned aerial vehicle based on the traffic volume prediction value, and sends the flight route of the unmanned aerial vehicle to the service operation system, and correspondingly the service operation system receives the flight route of the unmanned aerial vehicle.

In some embodiments, S407 to S410 show a process in which the service operation system evaluates the service volume of the unmanned aerial vehicle.

S407: The service operation system sends a flight route of the unmanned aerial vehicle to the network management system, where the flight route of the unmanned aerial vehicle may specifically include information such as flight time, a departure place, a destination, and a passing flight area. Correspondingly, the network management system receives the flight route of the unmanned aerial vehicle.

S408: The network management system performs evaluation based on the flight route of the unmanned aerial vehicle, and determines whether a traffic volume of the passing flight area can support a flight task of the unmanned aerial vehicle, to determine a traffic volume evaluation result.

S409: The network management system sends the traffic volume evaluation result to the service operation system, and correspondingly the service operation system receives the traffic volume evaluation result.

In some embodiments, when the traffic volume evaluation result is "no", S410 may be continued, to be specific, the service operation system adjusts the flight route of the unmanned aerial vehicle, and continues to perform evaluation until the traffic volume evaluation result is "yes".

According to the traffic volume prediction method in some embodiments of this application, a traffic volume prediction service of an unmanned aerial vehicle service is configured by the network management system, so that the service operation system can determine a proper flight route based on the flight task. This improves network resource usage.

It should be understood that sequence numbers of the foregoing processes do not indicate an execution sequence. The execution sequence of the processes is determined based on functions and internal logic of the processes, and is not construed as any limitation on the implementation processes of the embodiments of this application.

The traffic volume prediction method according to the embodiments of this application is described in detail above with reference to FIG. 1 to FIG. 4, and an apparatus according to the embodiments of this application is described in detail below with reference to FIG. 5 to FIG. 7.

Figure 5:
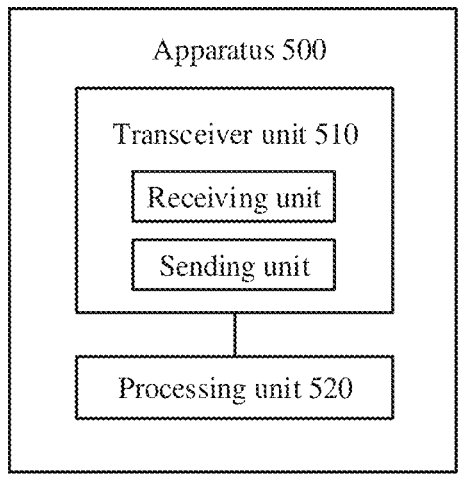
FIG. 5 is a schematic block diagram of an apparatus according to at least an embodiment of this application.

FIG. 5 shows an apparatus 500 according to an embodiment of this application. The apparatus 500 may be a first management device, or may be an apparatus that can support the first management device in implementing a function of the first management device, for example, may be a chip or a chip system that may be used in the first management device. The apparatus 500 includes a transceiver unit 510 and a processing unit 520. Further, the transceiver unit 510 may include a receiving unit and a sending unit, where the receiving unit is configured to perform the following receiving procedure corresponding to the transceiver unit 510, and the sending unit is configured to perform the following sending procedure corresponding to the transceiver unit 510.

The transceiver unit 520 is configured to receive a first message from a second management device, where the first message is used to request the first management device to perform traffic volume prediction, the first message includes a predicted object, a traffic type, and prediction requirement information, and the prediction requirement information includes a prediction granularity and/or a prediction period, where the prediction granularity includes at least one of the following: a prediction area, a prediction service type, a prediction slice, a prediction cell, a prediction public land mobile communications network PLMN, or a prediction tenant. The processing unit 520 is configured to determine, for the predicted object based on the prediction requirement information, a predicted traffic volume corresponding to the traffic type.

In some embodiments, the traffic type includes at least one of the following: a quantity of users, user distribution, a user activation ratio, coverage, a throughput, a quantity of radio resource control RRC connections, a quantity of physical resource blocks PRBs, PRB usage, or load information.

In some embodiments, the predicted object includes at least one of the following: a service, a network, a network element, a network function, or a cell.

In some embodiments, before determining, for the predicted object based on the prediction requirement information, the predicted traffic volume corresponding to the traffic type, the processing unit 520 is further configured to configure traffic volume prediction service information for a managed object of the predicted object based on the first message, where the traffic volume prediction service information is used to indicate to predict a traffic volume of the traffic type based on the prediction requirement information, and the traffic volume prediction service information includes the traffic type and the prediction requirement information.

In some embodiments, the processing unit 520 is specifically configured to: when the prediction requirement information includes the prediction granularity, collect the traffic volume based on the prediction granularity, and determine, based on the collected traffic volume, the predicted traffic volume corresponding to the traffic type at the prediction granularity; or when the prediction requirement information includes the prediction period, collect the traffic volume, and determine, based on the collected traffic volume, the predicted traffic volume corresponding to the traffic type in the prediction period; or when the prediction requirement information includes the prediction granularity and the prediction period, collect the traffic volume based on the prediction granularity, and determine, based on the collected traffic volume, the predicted traffic volume corresponding to the traffic type at the prediction granularity and in the prediction period.

In some embodiments, the transceiver unit 510 is further configured to send a second message to the second management device, where the second message is used to indicate a traffic volume prediction result, and the second message carries at least one predicted traffic volume corresponding to the traffic type.

In some embodiments, the transceiver unit 510 is further configured to: receive a third message from the second management device, where the third message is used to request the first management device to return the predicted traffic volume, and the third message carries information about a to-be-queried object and information about a query granularity; and send a fourth message to the second management device based on the third message, where the fourth message is used to indicate a predicted traffic volume of the to-be-queried object at the query granularity.

In some embodiments, the transceiver unit 510 is further configured to: receive a fifth message from the second management device, where the fifth message is to request to perform traffic volume evaluation, and the fifth message carries information about an evaluated object, information about evaluation time, and a traffic volume requirement value; the processing unit 520 is further configured to: determine, based on the fifth message, whether the evaluated object can meet the traffic volume requirement value within the evaluation time; and the transceiver unit 510 is further configured to: send a sixth message to the second management device, where the sixth message is used to indicate a traffic volume evaluation result.

It should be understood that the apparatus 500 herein is implemented in a form of a functional unit. A term "unit" herein may refer to an application-specific integrated circuit (ASIC), an electronic circuit, a processor (for example, a shared processor, a dedicated processor, or a group processor) configured to execute one or more software or firmware programs, a memory, a merge logic circuit, and/or another suitable component that supports the described function. In an example, a person skilled in the art may understand that the apparatus 500 may be specifically the terminal device or the network device in the foregoing embodiments, and the apparatus 500 may be configured to perform procedures and/or steps corresponding to the first management device in the foregoing method embodiments. To avoid repetition, details are not described herein again.

Figure 6:
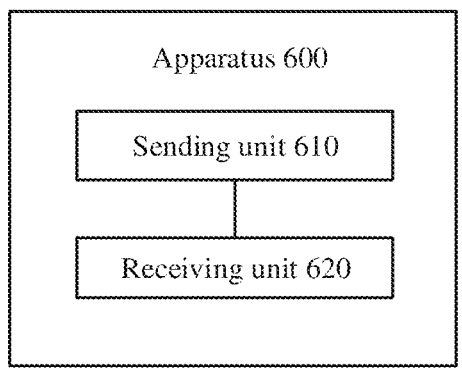
FIG. 6 is a schematic block diagram of another apparatus according to at least an embodiment of this application.

FIG. 6 shows an apparatus 600 according to an embodiment of this application. The apparatus 600 may be a second management device, or may be an apparatus that can support the second management device in implementing a function of the second management device, for example, may be a chip or a chip system that may be used in the second management device. The apparatus 600 includes a sending unit 610 and a receiving unit 620.

The sending unit 610 is configured to send a first message to a first management device, where the first message is used to request a first management device to perform traffic volume prediction, the first message includes a predicted object, a traffic type, and prediction requirement information, and the prediction requirement information includes a prediction granularity and/or a prediction period, where the prediction granularity includes at least one of the following: a prediction area, a prediction service type, a prediction slice, a prediction cell, a prediction public land mobile communications network PLMN, or a prediction tenant. The receiving unit 620 is configured to receive a predicted traffic volume from the first management device.

In some embodiments, the traffic type includes at least one of the following: a quantity of users, user distribution, a user activation ratio, coverage, a throughput, a quantity of radio resource control RRC connections, a quantity of physical resource blocks PRBs, PRB usage, or load information.

In some embodiments, the predicted object includes at least one of the following: a service, a network, a network element, a network function, or a cell.

In some embodiments, the receiving unit 620 is specifically configured to: receive a second message from the first management device, where the second message is used to indicate a traffic volume prediction result, and the second message carries at least one predicted traffic volume corresponding to the traffic type.

In some embodiments, the sending unit 610 is specifically configured to: send a third message to the first management device, where the third message is used to request the first management device to return the predicted traffic volume, and the third message carries information about a to-be-queried object and information about a query granularity; and the receiving unit 620 is specifically configured to: receive a fourth message from the first management device, where the fourth message is used to indicate a predicted traffic volume of the to-be-queried object at the query granularity.

In some embodiments, the sending unit 610 is specifically configured to: send a fifth message to the first management device, where the fifth message is to request to perform traffic volume evaluation, and the fifth message carries information about an evaluated object, information about evaluation time, and a traffic volume requirement value; and the receiving unit 620 is specifically configured to: receive a sixth message from the first management device, where the sixth message is used to indicate a traffic volume evaluation result.

It should be understood that the apparatus 600 herein is implemented in a form of a functional unit. A term "unit" herein may refer to an application-specific integrated circuit (ASIC), an electronic circuit, a processor (for example, a shared processor, a dedicated processor, or a group processor) configured to execute one or more software or firmware programs, a memory, a merge logic circuit, and/or another suitable component that supports the described function. In an example, a person skilled in the art may understand that the apparatus 600 may be specifically the terminal device or the network device in the foregoing embodiments, and the apparatus 600 may be configured to perform procedures and/or steps corresponding to the first management device in the foregoing method embodiments. To avoid repetition, details are not described herein again.

The apparatus 500 in the foregoing solutions has a function of implementing corresponding steps performed by the first management device in the foregoing methods. The apparatus 600 has a function of implementing corresponding steps performed by the second management device in the foregoing methods. The functions may be implemented by hardware, or may be implemented by hardware executing corresponding software. The hardware or the software includes one or more modules corresponding to the foregoing functions. For example, a sending unit and a receiving unit may be replaced by a communication interface, and another unit, for example, the processing unit, may be replaced by a processor, to separately perform a sending operation, a receiving operation, and a related processing operation in the method embodiments. In the embodiments of this application, the communication interface may be an apparatus, for example, a circuit, a module, a bus, a bus interface, or a transceiver, that can implement a communication function.

In the embodiments of this application, each of the apparatus in FIG. 5 and the apparatus in FIG. 6 may alternatively be a chip or a chip system, for example, a system on chip (system on chip, SoC). Correspondingly, the receiving unit and the sending unit may be a transceiver circuit of the chip. This is not limited herein.

Figure 7:
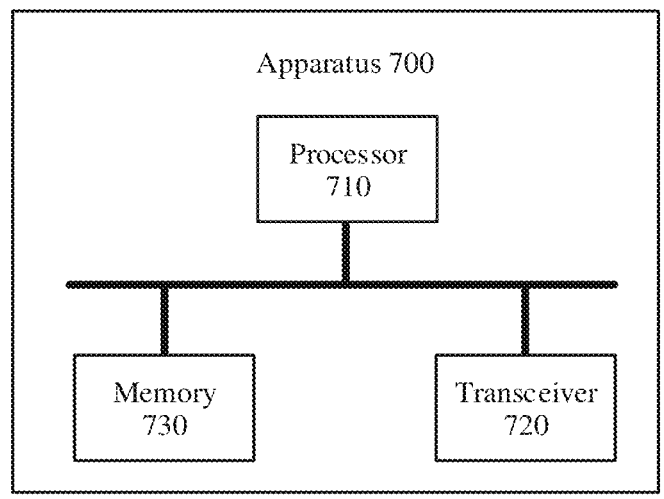
FIG. 7 is a schematic block diagram of another apparatus according to at least an embodiment of this application.

FIG. 7 shows another apparatus 700 according to an embodiment of this application. The apparatus 700 includes a processor 710 and a transceiver 720. In some embodiments, the apparatus 700 may further include a memory 750. In some embodiments, the memory 750 may be included in the processor 710. The processor 710, the transceiver 720, and the memory 750 communicate with each other through an internal connection path. The memory 750 is configured to store instructions. The processor 710 is configured to execute the instructions stored in the memory 750, to implement the method provided in the embodiments of this application.

In a possible implementation, the apparatus 700 is configured to perform procedures and steps corresponding to a first management device in the method provided in the embodiments of this application.

The processor 710 is configured to: receive a first message from a second management device through the transceiver 720, where the first message is used to request the first management device to perform traffic volume prediction, the first message includes a predicted object, a traffic type, and prediction requirement information, and the prediction requirement information includes a prediction granularity and/or a prediction period, where the prediction granularity includes at least one of the following: a prediction area, a prediction service type, a prediction slice, a prediction cell, a prediction public land mobile communications network PLMN, or a prediction tenant; and determine, based on the prediction requirement information, a traffic volume corresponding to the traffic type.

In a possible implementation, the apparatus 700 is configured to perform procedures and steps corresponding to a second management device in the method provided in the embodiments of this application.

The processor 710 is configured to: send a first message to a first management device through the transceiver 720, where the first message is used to request the first management device to perform traffic volume prediction, the first message includes a predicted object, a traffic type, and prediction requirement information, and the prediction requirement information includes a prediction granularity and/or a prediction period, where the prediction granularity includes at least one of the following: a prediction area, a prediction service type, a prediction slice, a prediction cell, a prediction public land mobile communications network PLMN, or a prediction tenant; and receive a predicted traffic volume from the first management device through the transceiver 720.

It should be understood that the apparatus 700 may be specifically the first management device or the second management device in the foregoing embodiments, and may be configured to perform steps and/or procedures corresponding to the first management device or the second management device in the foregoing method embodiments. In some embodiments, the memory 750 may include a read-only memory and a random access memory, and provide instructions and data for the processor. A part of the memory may further include a nonvolatile random access memory. For example, the memory may further store information about a device type. The processor 710 may be configured to execute the instructions stored in the memory; and when the processor 710 executes the instructions stored in the memory, the processor 710 is configured to perform steps and/or procedures corresponding to the first management device or the second management device in the method embodiments.

It should be understood that in some embodiments of this application, the processor of the foregoing apparatus may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, steps in the foregoing methods can be implemented by using a hardware integrated logic circuit in the processor or by using instructions in a form of software. With reference to the steps of the method disclosed in the embodiments of this application may be directly performed by a hardware processor, or may be performed and completed by using a combination of hardware and software units in the processor. The software unit may be located in a mature storage medium in the art, such as a random access memory, a flash memory, a read-only memory, a programmable read-only memory, an electrically erasable programmable memory, or a register. The storage medium is located in the memory, and the processor executes the instructions in the memory and completes the steps of the foregoing method in combination with the hardware of the processor. To avoid repetition, details are not described herein again.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, RAMs in many forms may be available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and method described in this specification include but are not limited to these memories and any memory of another proper type.

According to the method provided in the embodiments of this application, this application further provides a computer program product. The computer program product includes computer program code. When the computer program code is run on a computer, the computer is enabled to perform the method in any one of the foregoing embodiments.

According to the method provided in the embodiments of this application, this application further provides a computer-readable medium. The computer-readable medium stores program code. When the program code is run on a computer, the computer is enabled to perform the method in any one of the embodiments shown in FIG. 2 to FIG. 4.

According to the methods provided in the embodiments of this application, this application further provides a system. The system includes the foregoing one or more terminal devices and the foregoing one or more network devices.

In this application, "at least one" refers to one or more, and "a plurality of" refers to two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally represents an "or" relationship between the associated objects. "At least one of the following items (pieces)" or a similar expression thereof means any combination of these items, including any combination of singular items (pieces) or plural items (pieces). For example, at least one (piece) of a, b, or c may indicate the following cases: a, b, c, a and b, a and c, b and c, or a, b, and c, where a, b, and c may be singular or plural.

A person of ordinary skill in the art may be aware that, in combination with the examples described in the embodiments disclosed in this specification, method steps and units can be implemented by electronic hardware, computer software, or a combination thereof. To clearly describe the interchangeability between the hardware and the software, the foregoing has generally described steps and composition of each embodiment according to functions. Whether the functions are performed by hardware or software depends on a particular application and a design constraint condition of the technical solutions. A person of ordinary skill in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again. In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, displayed or discussed mutual couplings or direct couplings or communication connections may be indirect couplings or communication connections through some interfaces, apparatuses, or units, and may be connections in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium.

All or a part of the methods in the embodiments of this application may be implemented by using software, hardware, firmware, or any combination thereof. When the embodiments are implemented by using the software, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by a first management device, a first message from a second management device, wherein the first message is useable to request the first management device to perform traffic volume prediction, the first message comprises a predicted object, a traffic type, and prediction requirement information, and the prediction requirement information comprises a prediction granularity or a prediction period, wherein the prediction granularity comprises at least one of:
a prediction area, a prediction service type, a prediction slice, a prediction cell, or a prediction tenant; and
calculating, by the first management device, a predicted traffic volume corresponding to the traffic type for the predicted object based on the prediction requirement information and historical traffic volume of the traffic type for the predicted object, wherein the calculating, by the first management device, the predicted traffic volume comprises:
analyzing the historical traffic volume of the traffic type for the predicted object within a period of time, thereby obtaining a rule of the historical traffic volume; and
obtaining, according to the rule of the historical traffic volume and based on the historical traffic volume, the predicted traffic volume of the predicted object that meets the prediction requirement information;
wherein the predicted object comprises at least one of the following:
a service, a network, a network element, a network function or a cell,
wherein the traffic type comprises at least one of the following:
a quantity of users, user distribution, a user activation ratio, a throughput, a quantity of radio resource control (RRC) connections, a quantity of physical resource blocks (PRBs), or PRB usage.

2. The method according to claim 1, wherein before the determining, by the first management device for the predicted object based on the prediction requirement information, the predicted traffic volume corresponding to the traffic type, the method further comprises:
configuring, by the first management device, traffic volume prediction service information for a managed object of the predicted object based on the first message,
wherein the traffic volume prediction service information is useable to predict a traffic volume of the traffic type based on the prediction requirement information, and the traffic volume prediction service information comprises the traffic type and the prediction requirement information.

3. The method according to claim 1, wherein the determining, by the first management device for the predicted object based on the prediction requirement information, the predicted traffic volume corresponding to the traffic type comprises:
collecting, by the first management device, the traffic volume based on the prediction granularity, and determining, based on the collected traffic volume, the predicted traffic volume corresponding to the traffic type at the prediction granularity and in the prediction period in response to the prediction requirement information comprising the prediction granularity and the prediction period.

4. The method according to claim 1, wherein after the determining, by the first management device, for the predicted object based on the prediction requirement information, the predicted traffic volume corresponding to the traffic type, the method further comprises:
sending, by the first management device, a second message to the second management device, wherein the second message is useable to indicate a traffic volume prediction result, and the second message includes the predicted traffic volume corresponding to the traffic type.

5. The method according to claim 1, wherein after the determining, by the first management device, for the predicted object based on the prediction requirement information, the predicted traffic volume corresponding to the traffic type, the method further comprises:
receiving, by the first management device, a third message from the second management device, wherein the third message is useable to request the first management device to return the predicted traffic volume, and the third message includes information about a to-be-queried object and information about a query granularity; and
sending, by the first management device, a fourth message to the second management device based on the third message, wherein the fourth message is useable to indicate a predicted traffic volume of the to-be-queried object at the query granularity.

6. The method according to claim 1, wherein after the determining, by the first management device, for the predicted object based on the prediction requirement information, the predicted traffic volume corresponding to the traffic type, the method further comprises:
receiving, by the first management device, a fifth message from the second management device, wherein the fifth message is useable to request the first management device to perform traffic volume evaluation, and the fifth message includes an evaluated object, an evaluation time, and a traffic volume requirement value;
determining, by the first management device based on the fifth message, whether the evaluated object can meet the traffic volume requirement value within the evaluation time; and
sending, by the first management device, a sixth message to the second management device, wherein the sixth message is useable to indicate a traffic volume evaluation result.

7. A method, comprising:
sending, by a second management device, a first message to a first management device, wherein the first message is useable to request to perform traffic volume prediction,
the first message comprises a predicted object, a traffic type, and prediction requirement information,
the prediction requirement information comprises a prediction granularity or a prediction period, wherein the prediction granularity comprises at least one of: a prediction area, a prediction service type, a prediction slice, a prediction cell or a prediction tenant,
the predicted object comprises at least one of: a service, a network, a network element, a network function, or a cell, and the traffic type comprises at least one of: a quantity of users, user distribution, a user activation ratio, a throughput, a quantity of radio resource control (RRC) connections, a quantity of physical resource blocks (PRBs), or PRB usage;
receiving, by the second management device, the predicted traffic volume from the first management device, wherein the predicted traffic volume is calculated based on the prediction requirement information and historical traffic volume of the traffic type for the predicted object, wherein the calculating the predicted traffic volume comprises:
analyzing the historical traffic volume of the traffic type for the predicted object within a period of time, thereby obtaining a rule of the historical traffic volume; and
obtaining, according to the rule of the historical traffic volume and based on the historical traffic volume, the predicted traffic volume of the predicted object that meets the prediction requirement information.

8. The method according to claim 7, wherein
after the sending, by the second management device, the first message to the first management device, the method further comprises:
sending, by the second management device, a third message to the first management device, wherein the third message is useable to request the first management device to return the predicted traffic volume, and the third message includes information about a to-be-queried object and information about a query granularity; and
the receiving, by the second management device, the predicted traffic volume from the first management device comprises:
receiving, by the second management device, a fourth message from the first management device, wherein the fourth message is useable to indicate a predicted traffic volume of the to-be-queried object at the query granularity.

9. The method according to claim 7, wherein
after the sending, by the second management device, the first message to the first management device, the method further comprises:
sending, by the second management device, a fifth message to the first management device, wherein the fifth message is useable to request the first management device to perform traffic volume evaluation, and the fifth message includes an evaluated object, an evaluation time, and a traffic volume requirement value; and
the receiving, by the second management device, the predicted traffic volume from the first management device comprises:
receiving, by the second management device, a sixth message from the first management device, wherein the sixth message is useable to indicate a traffic volume evaluation result.

10. An apparatus, comprising a processor, wherein the processor is coupled to a memory, the memory is configured to store non-transitory instructions, and the processor is configured to execute the non-transitory instructions thereby causing the apparatus to:
receive a first message from a second management device, wherein the first message is useable to request a first management device to perform traffic volume prediction, the first message comprises a predicted object, a traffic type, and prediction requirement information, and the prediction requirement information comprises a prediction granularity or a prediction period, wherein the prediction granularity comprises at least one of:
  a prediction area, a prediction service type, a prediction slice, a prediction cell or a prediction tenant; and
calculate a predicted traffic volume corresponding to the traffic type for the predicted object based on the prediction requirement information and historical traffic volume of the traffic type for the predicted object, wherein the calculating, by the first management device, the predicted traffic volume comprises:
analyzing the historical traffic volume of the traffic type for the predicted object within a period of time, thereby obtaining a rule of the historical traffic volume; and
  obtaining, according to the rule of the historical traffic volume and based on the historical traffic volume, the predicted traffic volume of the predicted object that meets the prediction requirement information;
wherein the predicted object comprises at least one of the following:
  a service, a network, a network element, a network function, or a cell,
wherein the traffic type comprises at least one of the following:
  a quantity of users, user distribution, a user activation ratio, a throughput, a quantity of radio resource control (RRC) connections, a quantity of physical resource blocks (PRBs), or PRB usage.

11. The apparatus according to claim 10, wherein before the determine, for the predicted object based on the prediction requirement information, the predicted traffic volume corresponding to the traffic type, the processor is configured to execute the non-transitory instructions thereby further causing the apparatus to:
  configure traffic volume prediction service information for a managed object of the predicted object based on the first message,
  wherein the traffic volume prediction service information is useable to predict a traffic volume of the traffic type based on the prediction requirement information, and the traffic volume prediction service information comprises the traffic type and the prediction requirement information.

12. The apparatus according to claim 10, wherein the processor is further configured to execute the non-transitory instructions thereby causing the apparatus to:
  collect a traffic volume based on the prediction granularity, and determine, based on a collected traffic volume, the predicted traffic volume corresponding to the traffic type at the prediction granularity in response to the prediction requirement information comprising the prediction granularity;
  collect the traffic volume, and determine, based on the collected traffic volume, the predicted traffic volume corresponding to the traffic type in the prediction period in response to the prediction requirement information comprising the prediction granularity; or
  collect the traffic volume based on the prediction granularity, and determine, based on the collected traffic volume, the predicted traffic volume corresponding to the traffic type at the prediction granularity and in the prediction period in response to the prediction requirement information comprising the prediction granularity and the prediction period.

13. The apparatus according to claim 10, wherein the processor is further configured to execute the non-transitory instructions thereby further causing the apparatus to:
  send a second message to the second management device, wherein the second message is useable to indicate a traffic volume prediction result, and the second message includes the predicted traffic volume corresponding to the traffic type.

14. The apparatus according to claim 10, wherein the processor is further configured to execute the non-transitory instructions thereby further causing the apparatus to:
  receive a third message from the second management device, wherein the third message is useable to request the first management device to return the predicted traffic volume, and the third message includes information about a to-be-queried object and information about a query granularity; and
  send a fourth message to the second management device based on the third message, wherein the fourth message is useable to indicate a predicted traffic volume of the to-be-queried object at the query granularity.

15. The apparatus according to claim 10, wherein the processor is further configured to execute the non-transitory instructions thereby further causing the apparatus to:
  receive a fifth message from the second management device, wherein the fifth message is usable to request the first management device to perform traffic volume evaluation, and the fifth message includes an evaluated object, an evaluation time, and a traffic volume requirement value;
  determine, based on the fifth message, whether the evaluated object can meet the traffic volume requirement value within the evaluation time; and
  send a sixth message to the second management device, wherein the sixth message is useable to indicate a traffic volume evaluation result.

16. An apparatus, comprising a processor, wherein the processor is coupled to a memory, the memory is configured to store non-transitory instructions, and the processor is configured to execute the non-transitory instructions thereby causing the apparatus to:
  send a first message to a first management device, wherein the first message is useable to request to perform traffic volume prediction, the first message comprises a predicted object, a traffic type, and prediction requirement information, and the prediction requirement information comprises a prediction granularity or a prediction period, wherein the prediction granularity comprises at least one of:
    a prediction area, a prediction service type, a prediction slice, a prediction cell or a prediction tenant; and
  receive a predicted traffic volume from the first management device, the predicted traffic volume being based on the prediction requirement information and historical traffic volume of the traffic type for the predicted object, wherein the predicted traffic volume is calculated based on the prediction requirement information and historical traffic volume of the traffic type for the predicted object, wherein the calculating the predicted traffic volume comprises:
    analyzing the historical traffic volume of the traffic type for the predicted object within a period of time, thereby obtaining a rule of the historical traffic volume; and
    obtaining, according to the rule of the historical traffic volume and based on the historical traffic volume, the predicted traffic volume of the predicted object that meets the prediction requirement information;
  wherein the predicted object comprises at least one of the following:

a service, a network, a network element, a network function, or a cell, wherein the traffic type comprises at least one of the following:

a quantity of users, user distribution, a user activation ratio, a throughput, a quantity of radio resource control (RRC) connections, a quantity of physical resource blocks (PRBs), or PRB usage.

17. The apparatus according to claim 16, wherein the quantity of users is a quantity of registered users or a quantity of activated users.

* * * * *